US012578946B2

(12) United States Patent     (10) Patent No.:   US 12,578,946 B2
Castrejon, III et al.     (45) Date of Patent:    Mar. 17, 2026

(54) SYSTEM AND METHOD FOR DYNAMIC CODE PATCH DEPLOYMENT WITHIN A DISTRIBUTED NETWORK

(71) Applicant: BANK OF AMERICA CORPORATION, Charlotte, NC (US)

(72) Inventors: Tomas M. Castrejon, III, Fort Mill, SC (US); Michael Robert Young, Davidson, NC (US); David Nardoni, Sierra Madre, CA (US); Joel Townsend, Spring Church, PA (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 125 days.

(21) Appl. No.: 17/724,150

(22) Filed: Apr. 19, 2022

(65) Prior Publication Data
US 2023/0333835 A1    Oct. 19, 2023

(51) Int. Cl.
   *G06F 8/65*      (2018.01)
   *G06F 8/71*      (2018.01)
   *H04L 9/40*      (2022.01)
(52) U.S. Cl.
   CPC ................. *G06F 8/65* (2013.01); *G06F 8/71* (2013.01); *H04L 63/1433* (2013.01); *H04L 63/20* (2013.01)
(58) Field of Classification Search
   None
   See application file for complete search history.

(56) References Cited

U.S. PATENT DOCUMENTS

| | | | |
|---|---|---|---|
| 8,584,241 B1 * | 11/2013 | Jenks | G06F 21/566 726/23 |
| 10,474,813 B1 * | 11/2019 | Ismael | G06F 21/54 |
| 10,873,595 B1 | 12/2020 | Oliphant | |
| 11,115,348 B2 | 9/2021 | Sharifi Mehr | |
| 11,176,024 B1 | 11/2021 | Fernandes De Oliveira | |
| 11,231,919 B2 | 1/2022 | Gonzalez | |
| 11,249,750 B2 | 2/2022 | Ahuja | |

(Continued)

OTHER PUBLICATIONS

Yasumatsu, "Understanding the Responsiveness of Mobile App Developers to Software Library Updates", 2019, CODASPY '19, Mar. 25-27, 2019, Richardson, TX, USA (Year: 2019).*

(Continued)

*Primary Examiner* — Hossain M Morshed
(74) *Attorney, Agent, or Firm* — Moore & Van Allen PLLC; Lauren M. Stokes

(57) ABSTRACT

Various systems, methods, and computer program products are provided for dynamic code patch deployment within a distributed network. The method includes identifying one or more potential vulnerabilities within a software library that is associated with a first application within a decentralized network. The method also includes receiving a code update relating to the identified software library associated with the first application within the decentralized network. The method further includes identifying a second applications within the decentralized network that is also associated with the identified software library. The method still further includes causing a transmission of the code update to the second application within the decentralized network.

20 Claims, 5 Drawing Sheets

(56)                References Cited

U.S. PATENT DOCUMENTS

| | | | |
|---|---|---|---|
| 11,303,517 B2 | 4/2022 | Grant | |
| 11,327,738 B2* | 5/2022 | Dirks | G06F 9/45558 |
| 11,379,434 B2* | 7/2022 | Sherazi | G06F 11/0793 |
| 11,423,253 B2 | 8/2022 | Price | |
| 11,461,086 B2 | 10/2022 | Livne | |
| 11,544,050 B1* | 1/2023 | Ankit | G06F 21/629 |
| 2003/0167463 A1* | 9/2003 | Munsil | G06F 9/445 |
| | | | 717/170 |
| 2006/0282886 A1* | 12/2006 | Gaug | H04L 63/1408 |
| | | | 726/5 |
| 2011/0046775 A1* | 2/2011 | Bailey | B07C 3/02 |
| | | | 700/224 |
| 2013/0283252 A1* | 10/2013 | Mannarswamy | G06F 8/656 |
| | | | 717/168 |
| 2014/0229921 A1* | 8/2014 | Arora | G06F 11/3644 |
| | | | 717/125 |
| 2014/0237463 A1* | 8/2014 | Sriram | G06F 8/65 |
| | | | 717/172 |
| 2016/0275019 A1* | 9/2016 | Nam | G06F 12/1408 |
| 2017/0168811 A1* | 6/2017 | Petri | G06F 16/23 |
| 2017/0242687 A1* | 8/2017 | Saraswati | G06F 8/656 |
| 2019/0068640 A1* | 2/2019 | Araujo | G06F 21/53 |
| 2019/0138725 A1* | 5/2019 | Gupta | G06F 9/485 |
| 2019/0243636 A1* | 8/2019 | Sahu | G06F 8/656 |
| 2020/0257673 A1 | 8/2020 | Auer | |
| 2021/0044590 A1 | 2/2021 | Walker | |
| 2021/0067536 A1 | 3/2021 | Mylrea | |
| 2021/0224061 A1 | 7/2021 | Pillilli | |
| 2021/0390187 A1* | 12/2021 | Ahmed | G06F 21/577 |
| 2022/0038478 A1 | 2/2022 | Boudguiga | |
| 2022/0137955 A1 | 5/2022 | Aggarwal | |
| 2022/0179639 A1* | 6/2022 | Manley | G06F 11/3688 |
| 2022/0217116 A1 | 7/2022 | Schachter | |
| 2022/0286474 A1 | 9/2022 | Kuppa | |
| 2022/0321595 A1 | 10/2022 | Colquhoun | |

OTHER PUBLICATIONS

Scott, "Deploying Windows Service Packs to ManyComputers using BatchPatch", 2014, Published at: https://batchpatch.com/deploying-windows-service-packs-to-many-computers-using-batchpatch (Year: 2014).*

Manageengine, "Scheduled Deployment of OS Service Packs", 2021, Published at : https://www.manageengine.com/products/desktop-central/windows-service-pack-deployment.html (Year: 2021).*

Hicks, "Dynamic Software Updating", 2000, ACM (Year: 2000).*

Silver, "The Crucial Role of Regular Software Updates in the "Vulnerability Era"", 2025, https://it.ucsf.edu/news-events/news/crucial-role-regular-software-updates-vulnerability-era (Year: 2025).*

Fabregas, "Bit-Interleaved Coded Modulation", 2008, Foundations and Trends in Communications and Information Theory (Year: 2008).*

* cited by examiner

ENTITY
SYSTEM
200

100

NETWORK
150

CODE PATCH DEPLOYMENT ENGINE DEVICE
300

COMPUTING
DEVICE
SYSTEM
400

USER
110

ENTITY SYSTEM
200

NETWORK COMMUNICATION INTERFACE
210

PROCESSING DEVICE
220

MEMORY DEVICE
230

NETWORK SERVER APPLICATION
240

CODE PATCH DEPLOYMENT ENGINE
APPLICATION
250

ONE OR MORE ENTITY APPLICATIONS
270

DATA REPOSITORY
280

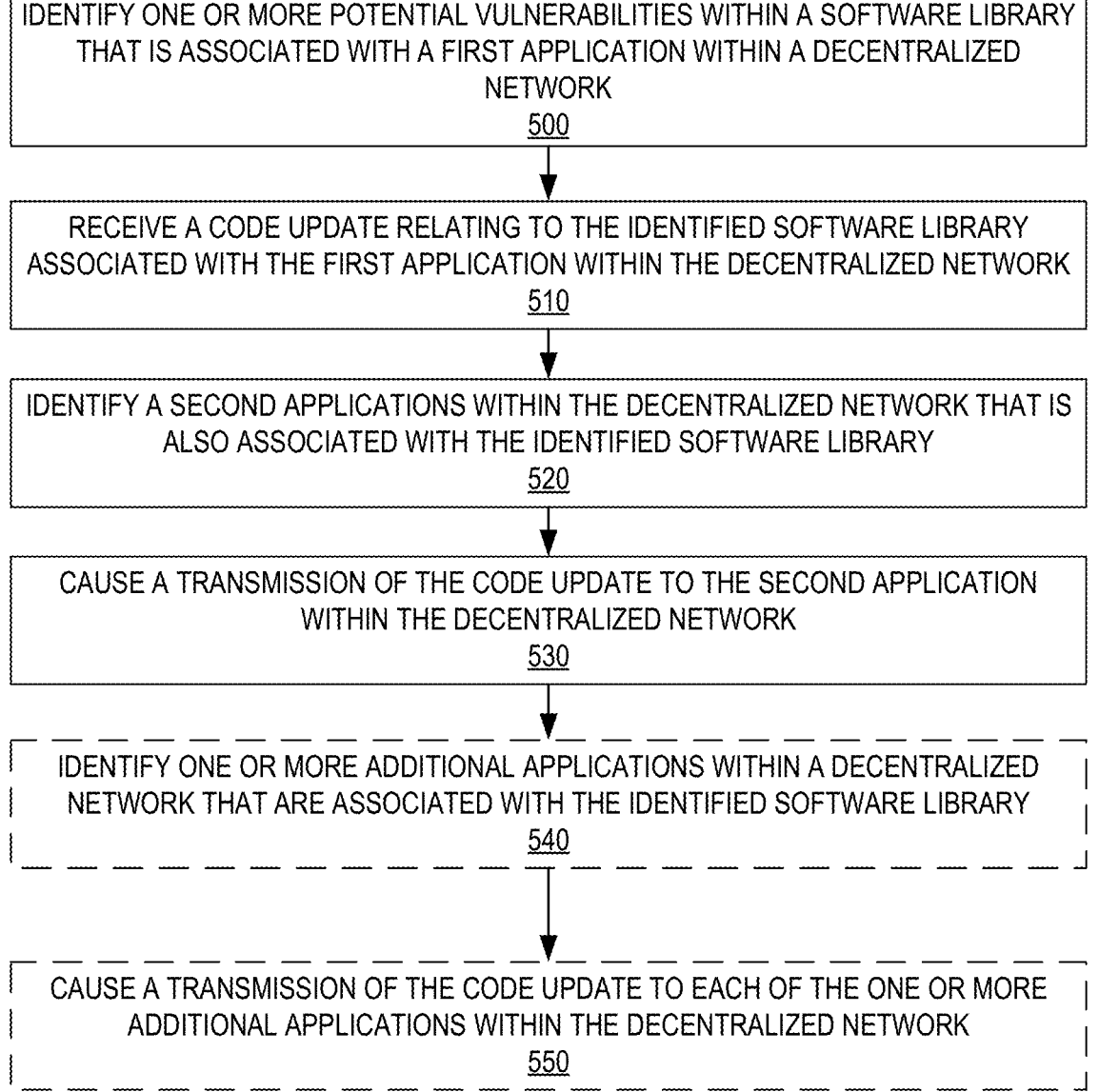

IDENTIFY ONE OR MORE POTENTIAL VULNERABILITIES WITHIN A SOFTWARE LIBRARY THAT IS ASSOCIATED WITH A FIRST APPLICATION WITHIN A DECENTRALIZED NETWORK
500

RECEIVE A CODE UPDATE RELATING TO THE IDENTIFIED SOFTWARE LIBRARY ASSOCIATED WITH THE FIRST APPLICATION WITHIN THE DECENTRALIZED NETWORK
510

IDENTIFY A SECOND APPLICATIONS WITHIN THE DECENTRALIZED NETWORK THAT IS ALSO ASSOCIATED WITH THE IDENTIFIED SOFTWARE LIBRARY
520

CAUSE A TRANSMISSION OF THE CODE UPDATE TO THE SECOND APPLICATION WITHIN THE DECENTRALIZED NETWORK
530

IDENTIFY ONE OR MORE ADDITIONAL APPLICATIONS WITHIN A DECENTRALIZED NETWORK THAT ARE ASSOCIATED WITH THE IDENTIFIED SOFTWARE LIBRARY
540

CAUSE A TRANSMISSION OF THE CODE UPDATE TO EACH OF THE ONE OR MORE ADDITIONAL APPLICATIONS WITHIN THE DECENTRALIZED NETWORK
550

*FIG. 5*

SYSTEM AND METHOD FOR DYNAMIC CODE PATCH DEPLOYMENT WITHIN A DISTRIBUTED NETWORK

TECHNOLOGICAL FIELD

An example embodiment relates generally to code patch deployment, and more particularly, to dynamic code patch deployment within a distributed network.

BACKGROUND

Software is constantly updated and revised to improve security. Applications often use the same software libraries as other application. As such, a security vulnerability in the code of one application can sometimes also be present in the code of another application. Therefore, there exists a need for a system that can improve deployment of code across multiple applications.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for dynamic code patch deployment within a distributed network is provided. The system includes at least one non-transitory storage device and at least one processing device coupled to the at least one non-transitory storage device. The at least one processing device is configured to identify one or more potential vulnerabilities within a software library that is associated with a first application within a decentralized network. The at least one processing device is also configured to receive a code update relating to the identified software library associated with the first application within the decentralized network. The at least one processing device is further configured to identify a second applications within the decentralized network that is also associated with the identified software library. The at least one processing device is still further configured to cause a transmission of the code update to the second application within the decentralized network.

In some embodiments, the at least one processing device is further configured to identify one or more additional applications within a decentralized network that are associated with the identified software library and cause a transmission of the code update to each of the one or more additional applications within the decentralized network.

In some embodiments, the at least one processing device is further configured to determine one or more recommended code updates based on the one or more identified potential vulnerabilities. In some embodiments, the code update is a revised version of at least a portion of a code within the software library that includes at least one of the one or more potential vulnerabilities. In some embodiments, each of the first application and the second application store the software library separately.

In some embodiments, the at least one processing device is further configured to cause a deployment of the code update to the software library associated with the first application and the software library associated with the second application individually. In some embodiments, the decentralized network includes a plurality of applications including the first application and the second application with each of the plurality of applications store at least a portion of operating code individually.

In another example embodiment, a computer program product for dynamic code patch deployment within a distributed network is provided. The computer program product includes at least one non-transitory computer-readable medium having computer-readable program code portions embodied therein. The computer-readable program code portions include an executable portion configured to identify one or more potential vulnerabilities within a software library that is associated with a first application within a decentralized network. The computer-readable program code portions also include an executable portion configured to receive a code update relating to the identified software library associated with the first application within the decentralized network. The computer-readable program code portions further include an executable portion configured to identify a second applications within the decentralized network that is also associated with the identified software library. The computer-readable program code portions still further include an executable portion configured to cause a transmission of the code update to the second application within the decentralized network.

In some embodiments, the computer-readable program code portions also include an executable portion configured to identify one or more additional applications within a decentralized network that are associated with the identified software library and an executable portion configured to cause a transmission of the code update to each of the one or more additional applications within the decentralized network.

In some embodiments, the computer-readable program code portions also include an executable portion configured to determine one or more recommended code updates based on the one or more identified potential vulnerabilities. In some embodiments, the code update is a revised version of at least a portion of a code within the software library that includes at least one of the one or more potential vulnerabilities. In some embodiments, each of the first application and the second application store the software library separately.

In some embodiments, the computer-readable program code portions also include an executable portion configured to cause a deployment of the code update to the software library associated with the first application and the software library associated with the second application individually. In some embodiments, the decentralized network comprises a plurality of applications including the first application and the second application with each of the plurality of applications store at least a portion of operating code individually.

In still another example embodiment, a computer-implemented method for dynamic code patch deployment within a distributed network is provided. The method includes identifying one or more potential vulnerabilities within a software library that is associated with a first application within a decentralized network. The method also includes receiving a code update relating to the identified software library associated with the first application within the decentralized network. The method further includes identifying a second applications within the decentralized network that is also associated with the identified software library. The method still further includes causing a transmission of the code update to the second application within the decentralized network.

In some embodiments, the method also includes identifying one or more additional applications within a decentralized network that are associated with the identified software library and causing a transmission of the code update to each of the one or more additional applications within the decentralized network.

In some embodiments, the method also includes determining one or more recommended code updates based on the one or more identified potential vulnerabilities. In some embodiments, the code update is a revised version of at least a portion of a code within the software library that includes at least one of the one or more potential vulnerabilities.

In some embodiments, each of the first application and the second application store the software library separately and the method also includes causing a deployment of the code update to the software library associated with the first application and the software library associated with the second application individually.

In some embodiments, the decentralized network includes a plurality of applications including the first application and the second application with each of the plurality of applications store at least a portion of operating code individually.

Embodiments of the present disclosure address the above needs and/or achieve other advantages by providing apparatuses (e.g., a system, computer program product and/or other devices) and methods for dynamic code patch deployment within a distributed network. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
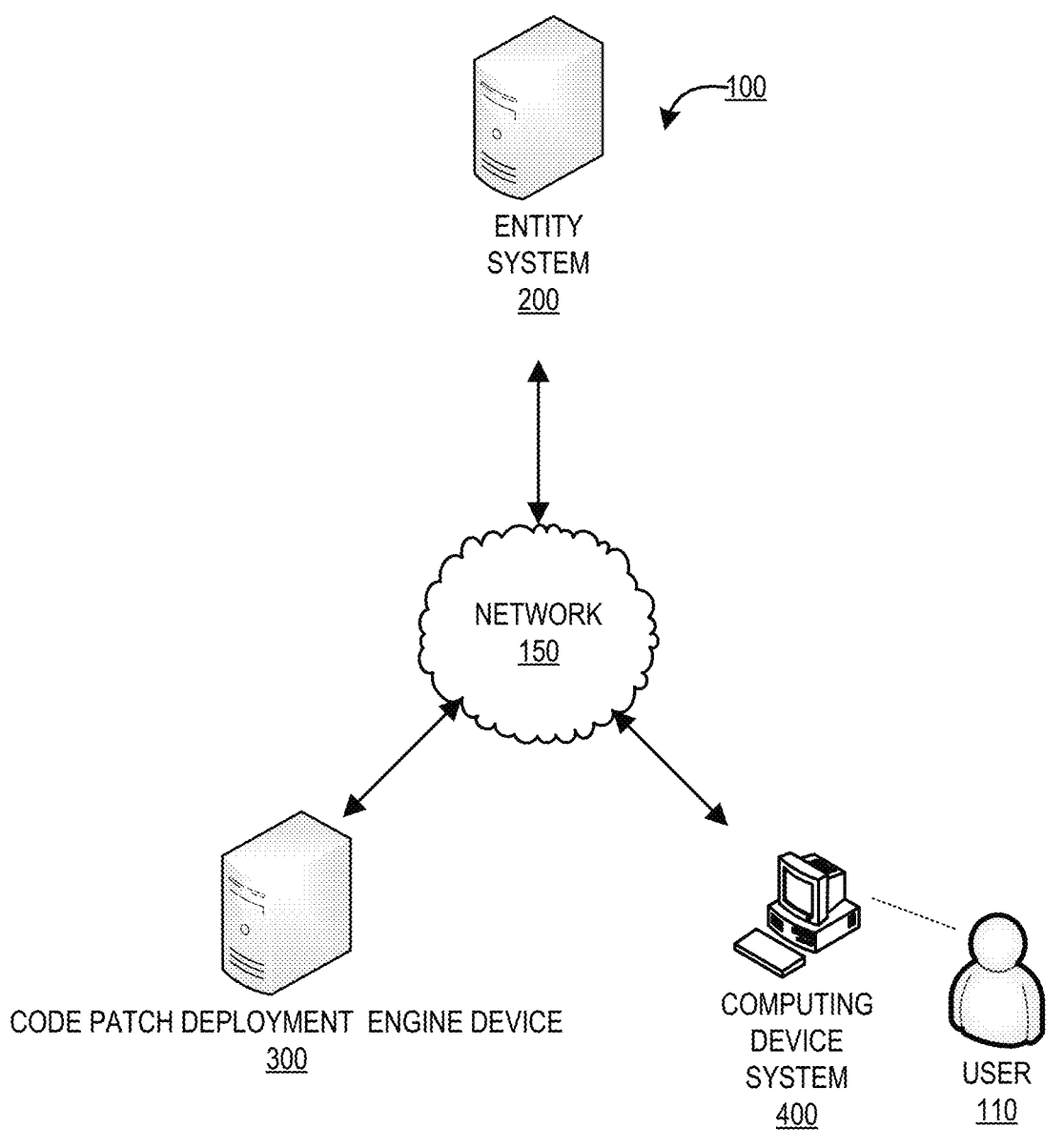
Figure 2:
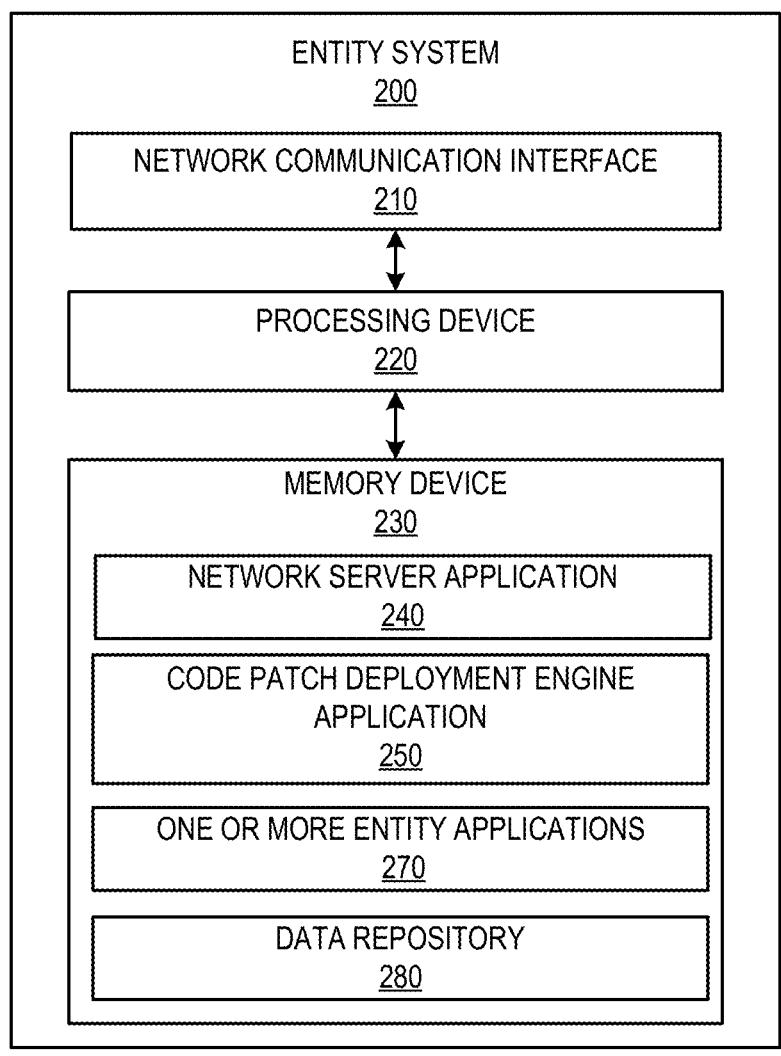
Figure 3:
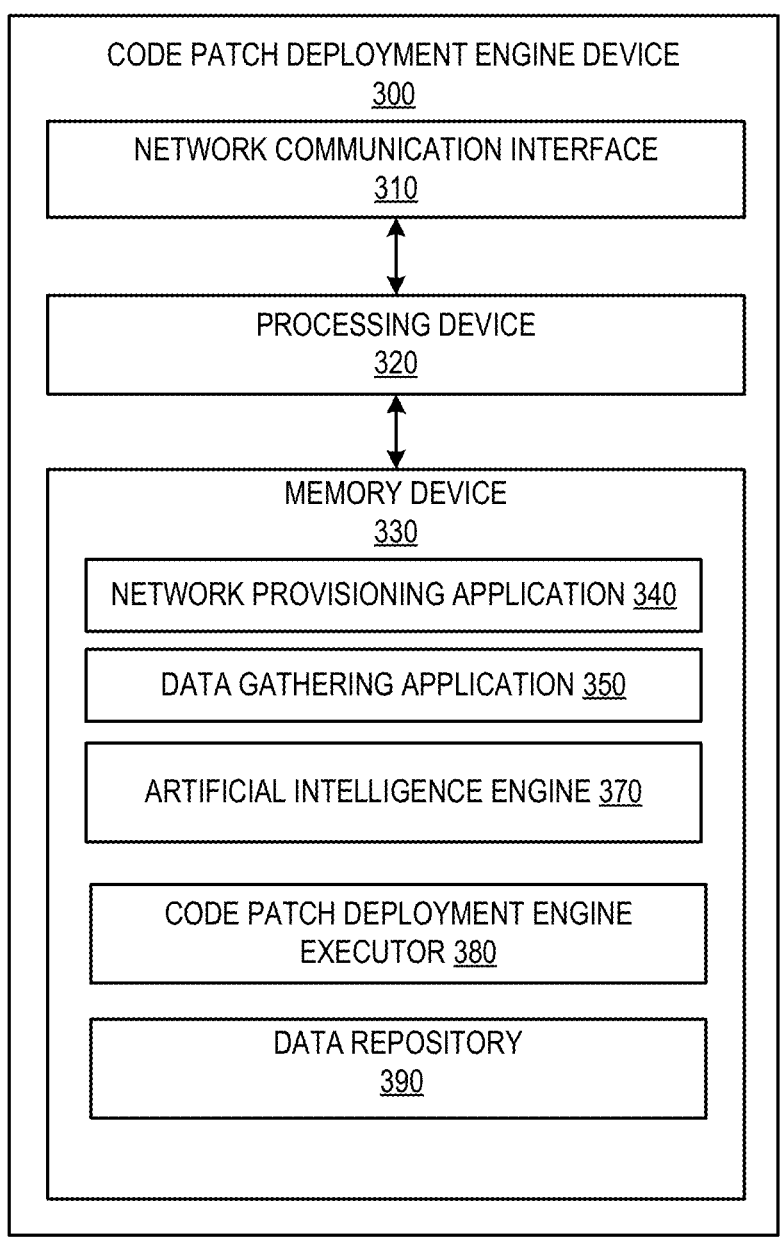
Figure 4:
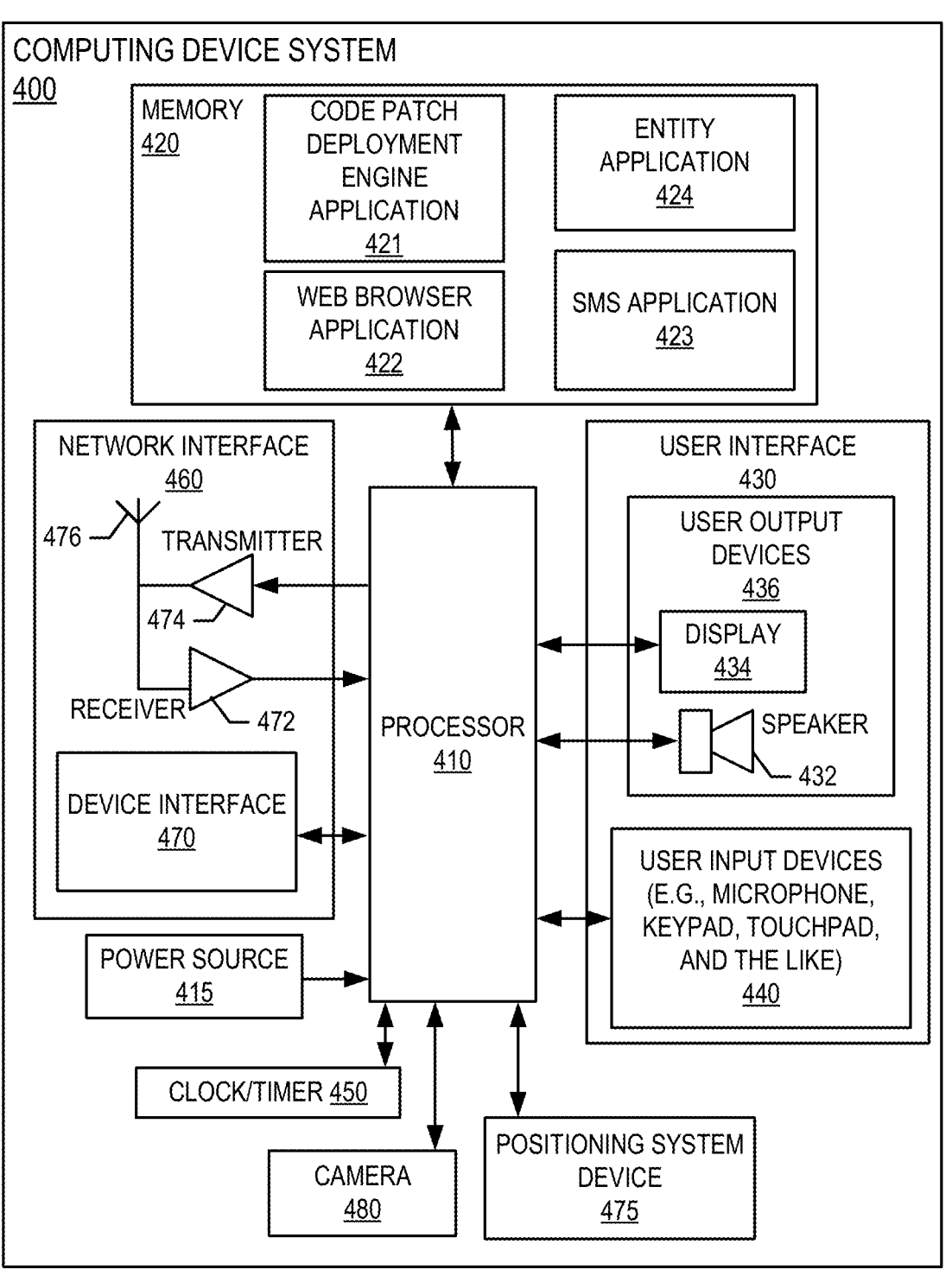

Having thus described embodiments of the disclosure in general terms, reference will now be made the accompanying drawings, wherein:

FIG. 1 provides a block diagram illustrating a system environment for dynamic code patch deployment within a distributed network, in accordance with embodiments of the present disclosure;

FIG. 2 provides a block diagram illustrating the entity system 200 of FIG. 1, in accordance with embodiments of the present disclosure;

FIG. 3 provides a block diagram illustrating a code patch deployment engine device 300 of FIG. 1, in accordance with embodiments of the present disclosure;

FIG. 4 provides a block diagram illustrating the computing device system 400 of FIG. 1, in accordance with embodiments of the present disclosure;

FIG. 5 illustrates a flow chart of the method of dynamic code patch deployment within a distributed network in accordance with an embodiment of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichoto-miser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Applications use software libraries to operate effectively. Software libraries are often the same or similar across different applications, as applications can have portions of operations that are the same or similar to other applications. However, in decentralized networks, the application code is typically separate from one another, such that an update to the code of a first application is not automatically carried out on the second application, even when the applications incorporate the same code for a given software library. Potential vulnerabilities in code must be promptly fixed in order to provide security for a network and data on said network. However, in decentralized networks, the same code can be stored and used by different applications and therefore updates need to be deployed across all applications that used the given code.

Various embodiments of the present disclosure allow for the identification and deployment of a code update for a software library across multiple applications that use the software library. In an instance in which a potential vulnerability is found, the system receives a code update that is intended for the software library of a first application. The system then determines one or more additional applications that use the same software library. Upon determining the one or more additional applications that use the same software library, the system can then cause a transmission of the code update to each application for deployment.

FIG. 1 provides a block diagram illustrating a system environment 100 for dynamic code patch deployment within a distributed network. As illustrated in FIG. 1, the system environment 100 includes a code patch deployment engine device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The code patch deployment engine device 300 is a system of the present disclosure for performing one or more process steps described herein. In some embodiments, the code patch deployment engine device 300 may be an independent system. In some embodiments, the code patch deployment engine device 300 may be a part of the entity system 200. For example, the methods discussed herein may be carried out by the entity system 200, the code patch deployment engine device 300, the computing device system 400, and/or a combination thereof.

The code patch deployment engine device 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the code patch deployment engine device 300 is configured to communicate information or instructions with the entity system 200, and/or the computing device system 400 across the network 150. While entity system 200, the code patch deployment engine device 300, the computing device system 400, and server device(s) are illustrated as separate components communicating via network 150, one or more of the components discussed here may be carried out via the same system (e.g., a single system may include the entity system 200 and the code patch deployment engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the code patch deployment engine device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a code patch deployment engine application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the code patch deployment engine application 250, the one or more entity application 270 to perform certain logic, data-extraction, and data-storing functions of the entity system 200 described herein, as well as communication functions of the entity system 200.

The network server application 240, the code patch deployment engine application 250, and the one or more entity applications 270 are configured to store data in the data repository 280 or to use the data stored in the data repository 280 when communicating through the network communication interface 210 with the code patch deployment engine device 300, and/or the computing device system 400 to perform one or more process steps described herein. In some embodiments, the entity system 200 may receive instructions from the code patch deployment engine device 300 via the code patch deployment engine application 250 to perform certain operations. The code patch deployment engine application 250 may be provided by the code patch deployment engine device 300. The one or more entity applications 270 may be any of the applications used, created, modified, facilitated, and/or managed by the entity system 200. The code patch deployment engine application 250 may be in communication with the code patch deployment engine device 300. In some embodiments, portions of the methods discussed herein may be carried out by the entity system 200.

FIG. 3 provides a block diagram illustrating the code patch deployment engine device 300 in greater detail, in accordance with various embodiments.). As illustrated in FIG. 3, in one embodiment, the code patch deployment engine device 300 includes one or more processing devices 320 operatively coupled to a network communication interface 310 and a memory device 330. In certain embodiments, the code patch deployment engine device 300 is operated by an entity, such as a financial institution. In some embodiments, the code patch deployment engine device 300 is owned or operated by the entity of the entity system 200. In some embodiments, the code patch deployment engine device 300 may be an independent system. In alternate embodiments, the code patch deployment engine device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the code patch deployment engine device 300 described herein. For example, in one embodiment of the code patch deployment engine device 300, the memory device 330 includes, but is not limited to, a network provisioning application 340, a data gathering application 350, an artificial intelligence engine 370, a code patch deployment engine executor 380, and a data repository 390 comprising any data processed or accessed by one or more applications in the memory device 330. The computer-executable program code of the network provisioning application 340, the data gathering application 350, the artificial intelligence engine 370, and the code patch deployment engine executor 380 may instruct the processing device 320 to perform certain logic, data-processing, and data-storing functions of the code patch deployment engine device 300 described herein, as well as communication functions of the code patch deployment engine device 300.

The network provisioning application 340, the data gathering application 350, the artificial intelligence engine 370, and the code patch deployment engine executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the code patch deployment engine executor 380 may store the data extracted or received from the entity system 200, and the computing device system 400 in the data repository 390. In some embodiments, the network provisioning application 340, the data gathering application 350, the artificial intelligence engine 370, and the code patch deployment engine executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned. The computing device system 400 of various embodiments may be capable of rendering an API configuration.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/ code executed by the processor 410 to implement the functions of the computing device system 400 and/or one or more of the process/method steps described herein. For example, the memory 420 may include such applications as a conventional web browser application 422, a code patch deployment engine application 421, entity application 424. These applications also typically instructions to a graphical user interface (GUI) on the display 430 that allows the user 110 to interact with the entity system 200, the code patch deployment engine device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the code patch deployment engine application 421 provided by the code patch deployment engine device 300 allows the user 110 to access the code patch deployment engine device 300. In some embodiments, the entity application 424 provided by the entity system 200 and the code patch deployment engine application 421 allow the user 110 to access the functionalities provided by the code patch deployment engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates another example method of dynamic code patch deployment within a distributed network. The method may be carried out by a system discussed herein (e.g., the entity system 200, the code patch deployment engine device 300, the computing device system 400, and/or the local device(s) 500). An example system may include at least one non-transitory storage device and at least one processing device coupled to the at least one non-transitory storage device. In such an embodiment, the at least one processing device is configured to carry out the method discussed herein.

The method may be carried out on a decentralized network on which a plurality of applications is individually stored on devices. Each application may have at least a portion of dedicated storage that includes one or more software libraries. Software libraries may be similar or the same across different applications, while still being stored separately. As such, a code update to a software library for one application may also need to be deployed to other applications that use the same software library. As such, various embodiments of the present disclosure may allow for the determination of applications that use a specific software library and allow for deployment of any code updates to said applications.

Referring now to Block 500 of FIG. 5, the method includes identifying one or more potential vulnerabilities within a software library that is associated with a first application within a decentralized network. The one or more potential vulnerabilities may be determined automatically (e.g., a run-time error may occur that indicates a portion of code that is inoperative or vulnerable) and/or manually (e.g., a user may discover a potential vulnerability and take one or more actions that can be determined by the system to be in response to the potential vulnerability). In some instances, the potential vulnerability may be determined based on the code update received as discussed in reference to Block 510 below.

Referring now to Block 510 of FIG. 5, the method includes receiving a code update relating to the identified software library associated with the first application within the decentralized network. The identified software library is the software library in which the potential vulnerability is identified. The code update may be a portion of the code relating to the identified software library. In some instances, the code update may be the entirety of the code relating to the identified software library. The code update may also include one or more updates to code outside of the software library (e.g., the underlying application code may be revised to accommodate the software library update. The code update may include the portions of code to replace and/or the location for the code update to be installed (e.g., to which software library the code update relates).

The code update may be at least partially automatically created. For example, based on the potential vulnerability, the system may generate the code update. In such an example, the user may be able to accept, decline, or revise the code update before deployment. The system may generate multiple recommended code updates to be used, in which the user may select the code update to deploy.

In some embodiments, the code update may be manually generated and provided to the system (e.g., a user may revise the code of the software library and upload the code update to the system). The code update may indicate where to be deployed (e.g., to which software library the code update is intended). In such an instance, the system may be configured to determine the location to deploy the code update. In some instances, a user may provide an indication of the location within an application for which the code update is to be deployed.

Referring now to Block 520 of FIG. 5, the method includes identifying a second applications within the decentralized network that is also associated with the identified software library. Different applications across the decentralized network may use the same or similar software libraries to carry out the operations of the given application. However, each application may individually store the software library, such that an update to one application may not be carried out on all applications using the same or similar software library.

Various embodiments of the present disclosure allow for the identification of additional applications within the decentralized network that also use a software library that is being updated by a code update. The identification may be automated by the system. For example, the system may scan or have other information that indicates the software libraries used by each application, such that the system can determine all applications that use a software library that is being updated.

Additionally or alternatively, the system may receive a user selection of one or more applications to which a code update should be deployed. The user selection indicates one or more additional application that also use the software library and therefore should also have the code update deployed. The user selection may be included with the code update (e.g., the code update may indicate the applications to be updated). Alternatively, the user selection may be provided separate from the code update (e.g., the system may provide a portion of the user display to select the application for which a code update is to be deployed).

The system may prompt a user to confirm one or more applications to have the code update deployed based on the identification of the additional application that also use the software libraries. The user may receive a prompt that allows the user to select one or more applications to be update that use the software library related to the code update. For example, the system may identified Application B and Application C that use the same software library that is updated in Application A, and the system may prompt the user to indicate whether the code update should also be deployed to Application B and/or Application C.

Referring now to Block 530 of FIG. 5, the method includes causing a transmission of the code update to the second application within the decentralized network. The system may cause the transmission of the code update to the memory relating to the identified applications. In various embodiments, each application may have at least a portion of code stored in memory dedicated to the given application. Causing the transmission of the code update to the applications may be the transmission of the code update to any device that has the given application installed. For example, an application may be stored on a plurality of user devices and the code update may be transmitted to one or more of the plurality of user devices.

Upon transmission of the code update, the code update may each be deployed on each application (e.g., the code update may be deployed on the second application). In some instances, the code update may be transmitted to the first application and any subsequent applications that use the identified software libraries (e.g., second application) simultaneously or in near succession (e.g., the code update is not transmitted to the first application until after any additional application in which the code update is to be deployed is identified). Additionally or alternatively, the code update may be transmitted (and/or deployed) to the first application before any additional applications are identified.

The system may cause the transmission of the code update to one or more user devices (e.g., compute device system 400) that use an identified application. For example, the system may cause the transmission of the code update to any mobile device that has an identified application installed. In some instances, the system may prompt a user to confirm the transmission before causing the transmission to a given user device (e.g., a user may select an instance in which an application is updated). The system may be configured to cause deployment of the code update to each of the identified applications (e.g., the first application and the second application). The code update may include instructions for deployment (e.g., location of software library being updated).

Referring now to optional Block 540 of FIG. 5, the method includes identifying one or more additional applications within a decentralized network that are associated with the identified software library. The identification of one or more additional applications may be the same or similar operations to the identification of the second application discussed above in reference to Block 520 of FIG. 5. In some instances, the identification of the one or more additionally applications may be completed in parallel with the operations of Block 520 of FIG. 5. For example, the system may identify a plurality of application that uses the identified software library.

Referring now to optional Block 550 of FIG. 5, the method includes causing a transmission of the code update to each of the one or more additional applications within the decentralized network. The transmission of the code update to each of the one or more additional applications may be the same or similar operations to the transmission of the code update to the second application discussed above in reference to Block 530 of FIG. 5. In some instances, the transmission of the code update to each of the one or more additional applications may be completed in parallel with the operations of Block 520 of FIG. 5. For example, the code update may be deployed simultaneous or in close succession to each of the identified applications.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for dynamic code patch deployment within a distributed network, the system comprising:

at least one non-transitory storage device; and at least one processing device coupled to the at least one non-transitory storage device, wherein the at least one processing device is configured to:

identify one or more potential vulnerabilities within a software library that is associated with a first application comprising a code portion within a decentralized network;

transmit a code update relating to the identified software library, wherein the code update is transmitted as a modulation comprising encoding and interleaving;

receive from the transmission, by a dynamic code patch deployment engine in communication with the at least one processing device, of the code update relating to the identified software library associated with the code portion of the first application within the decentralized network;

identify, by the dynamic code patch deployment engine, a second code portion within a second application that matches the code portion of the first application within the decentralized network that is also associated with the identified software library, wherein the second application is stored separately from the first application;

cause, by the dynamic code patch deployment engine to a memory of the second application dedicated to the code portion, a transmission of the code update to the second application within the decentralized network; and automatically, by a dynamic code patch deployment engine executor associated with the dynamic code patch deployment engine and based on the transmission of the code update, cause deployment of a dynamic code update to the first application and the second application simultaneously at a memory of the first application dedicated to the code portion and the memory of the second application, wherein the dynamic code update comprises instructions for deployment of the dynamic code update for the first application and the second application.

2. The system of claim 1, wherein the at least one processing device is further configured to:

identify one or more additional applications within a decentralized network that are associated with the identified software library; and cause, after the identification of the one or more additional applications, a transmission of the code update to each of the one or more additional applications within the decentralized network simultaneously with the transmission of the code update to the first application and the second application.

3. The system of claim 1, wherein the at least one processing device is further configured to determine one or more recommended code updates based on the one or more identified potential vulnerabilities.

4. The system of claim 1, wherein the code update is a revised version of at least a portion of a code within the software library that includes at least one of the one or more potential vulnerabilities.

5. The system of claim 1, wherein each of the first application and the second application store the software library separately.

6. The system of claim 5, wherein the at least one processing device is further configured to cause a deployment of the code update to the software library associated with the first application and the software library associated with the second application individually.

7. The system of claim 1, wherein the decentralized network comprises a plurality of applications including the first application and the second application, wherein each of the plurality of applications store at least a portion of operating code individually.

8. The system of claim 1, wherein the identification of the second application within the decentralized network is based on automatically scanning each software library used by each application individually and identifying the identified software library in the second application.

9. A computer program product for dynamic code patch deployment within a distributed network, the computer program product comprising at least one non-transitory computer-readable medium having computer-readable program code portions embodied therein, the computer-readable program code portions comprising:

an executable portion of the computer-readable program code, executable by at least one processing device, configured to identify one or more potential vulnerabilities within a software library that is associated with a first application comprising a code portion within a decentralized network;

an executable portion of the computer-readable program code, executable by at least one processing device, configured to transmit a code update relating to the identified software library, wherein the code update is transmitted as a modulation comprising encoding and interleaving;

an executable portion of the computer-readable program code, executable by at least one processing device, configured to receive from the transmission, by a dynamic code patch deployment engine in communication with the at least one processing device, of the code update relating to the identified software library associated with the code portion of the first application within the decentralized network;

an executable portion of the computer-readable program code, executable by at least one processing device, configured to identify, by the dynamic code patch deployment engine, a second code portion within a second application that matches the code portion of the first application within the decentralized network that is also associated with the identified software library, wherein the second application is stored separately from the first application;

an executable portion of the computer-readable program code, executable by at least one processing device, configured to cause, by the dynamic code patch deployment engine to a memory of the second application dedicated to the code portion, a transmission of the code update to the second application within the decentralized network; and an executable portion of the computer-readable program code, executable by at least one processing device, configured to automatically, by a dynamic code patch deployment engine executor associated with the dynamic code patch deployment engine and based on the transmission of a dynamic code update, cause deployment of the code update to the first application and the second application simultaneously at a memory of the first application dedicated to the code portion and the memory of the second application, wherein the dynamic code update comprises instructions for deployment of the dynamic code update for the first application and the second application.

10. The computer program product of claim 9, further comprising:

an executable portion of the computer-readable program code, executable by at least one processing device, configured to identify one or more additional applications within a decentralized network that are associated with the identified software library; and an executable portion of the computer-readable program code, executable by at least one processing device, configured to cause, after the identification of the one or more additional applications, a transmission of the code update to each of the one or more additional applications within the decentralized network simultaneously with the transmission of the code update to the first application and the second application.

11. The computer program product of claim 9, further comprising an executable portion of the computer-readable program code configured to determine one or more recommended code updates based on the one or more identified potential vulnerabilities.

12. The computer program product of claim 9, wherein the code update is a revised version of at least a portion of a code within the software library that includes at least one of the one or more potential vulnerabilities.

13. The computer program product of claim 9, wherein each of the first application and the second application store the software library separately.

14. The computer program product of claim 13, further comprising an executable portion of the computer-readable program code, executable by at least one processing device, configured to cause a deployment of the code update to the software library associated with the first application and the software library associated with the second application individually.

15. The computer program product of claim 9, wherein the decentralized network comprises a plurality of applications including the first application and the second application, wherein each of the plurality of applications store at least a portion of operating code individually.

16. A computer-implemented method for dynamic code patch deployment within a distributed network, the method comprising:

identifying one or more potential vulnerabilities within a software library that is associated with a first application comprising a code portion within a decentralized network;

transmitting a code update relating to the identified software library, wherein the code update is transmitted as a modulation comprising encoding and interleaving;

receiving from the transmission, by a dynamic code patch deployment engine in communication with the at least one processing device, of the code update relating to the identified software library associated with the code portion of the first application within the decentralized network;

identifying, by the dynamic code patch deployment engine, a second code portion within a second application that matches the code portion of the first application within the decentralized network that is also associated with the identified software library, wherein the second application is stored separately from the first application;

causing, by the dynamic code patch deployment engine to a memory of the second application dedicated to the code portion, a transmission of the code update to the second application within the decentralized network; and automatically, by a dynamic code patch deployment engine executor associated with the dynamic code patch deployment engine and based on the transmission of the code update, causing deployment of a dynamic code update to the first application and the second application simultaneously at a memory of the first application dedicated to the code portion and the memory of the second application, wherein the dynamic code update comprises instructions for deployment of the dynamic code update for the first application and the second application.

17. The method of claim 16, further comprising:

identifying one or more additional applications within a decentralized network that are associated with the identified software library; and causing, after the identification of the one or more additional applications, a transmission of the code update to each of the one or more additional applications within the decentralized network simultaneously with the transmission of the code update to the first application and the second application.

18. The method of claim 16, further comprising determining one or more recommended code updates based on the one or more identified potential vulnerabilities.

19. The method of claim 16, wherein the code update is a revised version of at least a portion of a code within the software library that includes at least one of the one or more potential vulnerabilities.

20. The method of claim 16, wherein each of the first application and the second application store the software library separately and the method further comprises causing a deployment of the code update to the software library associated with the first application and the software library associated with the second application individually.

* * * * *